United States Patent
Miyake

(10) Patent No.: US 9,926,983 B2
(45) Date of Patent: Mar. 27, 2018

(54) SLIDING SHAFT AND STEERING DEVICE

(71) Applicant: JTEKT CORPORATION, Osaka-shi, Osaka (JP)

(72) Inventor: Kazunori Miyake, Kitakatsuragi-gun (JP)

(73) Assignee: JTEKT CORPORATION, Osaka (JP)

( * ) Notice: Subject to any disclaimer, the term of this patent is extended or adjusted under 35 U.S.C. 154(b) by 113 days.

(21) Appl. No.: 14/903,142

(22) PCT Filed: Jul. 17, 2014

(86) PCT No.: PCT/JP2014/068996
§ 371 (c)(1),
(2) Date: Jan. 6, 2016

(87) PCT Pub. No.: WO2015/008817
PCT Pub. Date: Jan. 22, 2015

(65) Prior Publication Data
US 2016/0153500 A1    Jun. 2, 2016

(30) Foreign Application Priority Data

Jul. 18, 2013 (JP) .................................. 2013-149609

(51) Int. Cl.
*B62D 5/04* (2006.01)
*F16D 3/06* (2006.01)
(Continued)

(52) U.S. Cl.
CPC ................. *F16D 3/06* (2013.01); *B62D 1/16* (2013.01); *B62D 1/20* (2013.01); *C08K 3/0066* (2013.01);
(Continued)

(58) Field of Classification Search
CPC ........... F16C 3/03; F16D 3/06; F16D 2300/10
(Continued)

(56) References Cited

U.S. PATENT DOCUMENTS

| 5,891,515 A * | 4/1999 | Dutheil ..................... B05D 1/24 |
| | | 427/185 |
| 8,262,484 B2 * | 9/2012 | Nakatani ................... B62D 1/16 |
| | | 464/16 |

(Continued)

FOREIGN PATENT DOCUMENTS

| CN | 1745013 A | 3/2006 |
| JP | H11-99355 A | 4/1999 |

(Continued)

OTHER PUBLICATIONS

PolymerProcessing.com, nylon-6,10, 2001 [retrieved on Jun. 28, 2017] Retrieved from the Internet: <http://www.polymerprocessing.com/polymers/PA610.html>.*

(Continued)

*Primary Examiner* — Gregory J Binda
(74) *Attorney, Agent, or Firm* — Oliff PLC

(57) ABSTRACT

In a sliding shaft, an outer circumferential surface of a male shaft is coated with a resin coating layer formed by a fluidized bed powder coating method using a powder coating material containing a base resin and at least either a carbon black or a metal oxide as an antistatic agent. A steering device includes this sliding shaft as an intermediate shaft transmitting steering force.

6 Claims, 5 Drawing Sheets

(51) Int. Cl.

| | |
|---|---|
| *F16C 3/03* | (2006.01) |
| *B62D 1/16* | (2006.01) |
| *B62D 1/20* | (2006.01) |
| *C08K 3/00* | (2018.01) |
| *C08K 3/04* | (2006.01) |
| *C08K 3/20* | (2006.01) |
| *C08L 77/06* | (2006.01) |
| *C08K 3/22* | (2006.01) |

(52) U.S. Cl.
CPC ............... *C08K 3/04* (2013.01); *C08K 3/20* (2013.01); *C08L 77/06* (2013.01); *F16C 3/03* (2013.01); *C08K 2003/2241* (2013.01); *F16D 2300/10* (2013.01)

(58) Field of Classification Search
USPC ........... 464/16, 162; 427/185, 195; 180/443, 180/444
See application file for complete search history.

(56) References Cited

U.S. PATENT DOCUMENTS

| | | | |
|---|---|---|---|
| 9,550,914 B2* | 1/2017 | Huraux | ............... C09D 5/037 |
| 2006/0162989 A1 | 7/2006 | Yamada | |
| 2010/0132499 A1 | 6/2010 | Nakatani et al. | |
| 2012/0301736 A1* | 11/2012 | Huraux | ............... C09D 5/037 |
| 2016/0153501 A1* | 6/2016 | Nishida | ............... C08L 77/06 |
| | | | 464/162 |

FOREIGN PATENT DOCUMENTS

| | | | |
|---|---|---|---|
| JP | 2002-321233 A | 11/2002 |
| JP | 2002-363476 A | 12/2002 |
| JP | 2004-162021 A | 6/2004 |
| JP | 2008-120250 A | 5/2008 |
| JP | 2008-222016 A | 9/2008 |
| JP | 2008-260359 A | 10/2008 |
| JP | 2011-173464 A | 9/2011 |

OTHER PUBLICATIONS

Oct. 7, 2014 International Search Report issued in International Patent Application No. PCT/JP2014/068996.

Feb. 23, 2017 Extended European Search Report issued in European Patent Application No. 14826602.6.

Nov. 28, 2017 Office Action issued in Chinese Patent Application No. 201480040773.0.

* cited by examiner

Comparative Example

SLIDING SHAFT AND STEERING DEVICE

TECHNICAL FIELD

The present invention relates to a sliding shaft including a male shaft and a female shaft connected to each other slidably along the axial direction, and a steering device for a vehicle including the sliding shaft as an intermediate shaft transmitting steering force.

BACKGROUND ART

An intermediate shaft of a steering device for a vehicle includes a sliding shaft in which, for example, a male shaft and a cylindrical female shaft are connected to each other to be expandable/contractible along the axial direction through engagement of splines (spline fitting) or the like. An outer circumferential surface of the male shaft or an inner circumferential surface of the female shaft including the spline is coated with a resin coating layer in some cases in order to fill a clearance between these shafts to reduce rattling noise or reduce backlash of a steering wheel occurring in a steering operation (see, for example, Patent Reference 1).

As one of methods for forming a resin coating layer, a fluidized bed powder coating method is known. Since no organic solvent is used in the fluidized bed powder coating method, this method has an advantage of low environmental load.

In the fluidized bed powder coating method, a powder coating material containing a base resin corresponding to a raw material of a resin coating layer is first prepared, and in a fluidized bed, the powder coating material is placed in a floating and fluidized state by blowing air or the like.

Subsequently, a male shaft or a female shaft, having been heated to a temperature equal to or higher than the melting point of the base resin, is immersed in the floating and fluidized powder coating material, and thus, the powder coating material is deposited, and allowed to melt and flow, on the outer circumferential surface of the male shaft or the inner circumferential surface of the female shaft (hereinafter sometimes generically referred to as the "deposited surface"), and then is solidified when the resultant is cooled thereafter, resulting in forming a resin coating layer on the deposited surface.

As the base resin corresponding to a raw material of the powder coating material, polyamide 11, polyamide 12 or the like is suitably used because such a resin can form a resin coating layer excellent in flowability when melted, and excellent also in the sliding property and the like.

PRIOR ART REFERENCE

Patent Reference

Patent Reference 1: JP-A-2008-222016

SUMMARY OF THE INVENTION

Problem that the Invention is to Solve

Recently, it has been desired that an intermediate shaft provided in a vehicle cabin can be also provided within, for example, an engine room having a high temperature, and for this purpose, it has been necessary to make a resin coating layer highly heat resistant.

Therefore, for example, polyamide 610 or the like that is more excellent in the heat resistance than a currently used resin and is excellent also in the friction/wear property, the sliding property and the like is being examined to be used as the base resin.

Polyamide 610 has, however, a problem in which it is not smoothly melted and flown because it has a high viscosity when melted and has a low throwing power after deposition, and hence is not easy to form a continuous resin coating layer.

As a countermeasure against this problem, for example, a heated male shaft or female shaft can be immersed in a floating and fluidized powder coating material repeatedly twice or more, while it is immersed, for example, merely once in a related-art technology, so as to increase the amount of deposited powder coating material, namely, so as to apply the powder coating material in a large thickness, to form a continuous resin coating layer.

In this case, however, there arises a problem in which a vacuum void is easily formed in the resultant resin coating layer.

Specifically, although the surface of the resin coating layer is rapidly cooled through contact with air, since the temperature of the male shaft or female shaft having been heated to a high temperature is difficult to lower, the inside of the resin coating layer is continuously in a melted state at a high temperature in a portion closer to the deposited surface.

As a result, in the resin coating layer, solidification and accompanying shrinkage proceed successively from the surface thereof, and hence a portion having a small density is formed locally in the vicinity of an interface of the deposited surface particularly in a thick part, and if the density of this portion is lower than a limit, a vacuum void is formed.

The resin coating layer applied in a large thickness is finished by polishing in accordance with a clearance between the male shaft and the female shaft, and if a vacuum void is formed inside, the void is exposed as a defect through the polishing, which is a cause of degradation of the strength and the like of the resin coating layer.

An object of the present invention is to provide a sliding shaft having a continuous resin coating layer free from a vacuum void that is formed on an outer circumferential surface of a male shaft or an inner circumferential surface of a female shaft by a fluidized bed powder coating method using a powder coating material.

Another object of the present invention is to provide a steering device including such a sliding shaft as an intermediate shaft.

Means for Solving the Problem

In order to solve the above-described problems, the present invention provides a sliding shaft comprising a male shaft and a cylindrical female shaft connected to each other slidably along an axial direction, an outer circumferential surface of the male shaft or an inner circumferential surface of the female shaft being coated with a resin coating layer, wherein
the resin coating layer is formed, by a fluidized bed powder coating method, by using a powder coating material, the powder coating material containing:
a base resin; and
at least one antistatic agent selected from a group including a carbon black and a metal oxide.

According to the present invention, since the powder coating material contains at least one antistatic agent selected from the group including a carbon black and a metal oxide, even if a powder coating material containing, as the base resin, polyamide 610, which cannot be smoothly melted and flown because it has a high viscosity when melted and has a low throwing power after deposition, is used, a continuous resin coating layer free from a vacuum void can be formed on the deposited surface, namely, on the outer circumferential surface of the male shaft or the inner circumferential surface of the female shaft.

Specifically, the powder coating material floats and is fluidized generally in the form of an agglomerated particle group in which a plurality of particles are agglomerated, and is deposited on the deposited surface as respective agglomerated particle groups or in a state where two or more agglomerated particle groups are further agglomerated. Then, the deposited agglomerated particle groups adjacent to each other are integrated while melting and flowing on the deposited surface so as to gradually grow along a surface direction, resulting in ultimately forming the continuous resin coating layer.

At least either a carbon black or a metal oxide used as the antistatic agent functions, as its name suggests, to inhibit the powder coating material from being charged and suppress the agglomeration of the powder coating material.

Therefore, when such an antistatic agent is contained, the respective agglomerated particle groups deposited on the deposited surface can be reduced in size and increased in number, and in addition, a distance between the adjacent agglomerated particle groups deposited on the deposited surface can be reduced, so that they can be easily integrated while melting and flowing.

Besides, at least either a carbon black or a metal oxide used as the antistatic agent also functions, owing to its conductivity, to make heat from the deposited surface easily conducted to the powder coating material.

Therefore, when such an antistatic agent is contained, the powder coating material constituting the agglomerated particle groups can be easily allowed to flow and melt on the deposited surface.

Accordingly, even if the powder coating material containing polyamide 610 as the base resin is used, the continuous resin coating layer can be formed without applying the powder coating material in a large thickness, and hence, the formation of a vacuum void otherwise caused by the thick application can be prevented.

The powder coating material is preferably obtained by dry blending a powder containing the base resin with the antistatic agent.

If at least either a carbon black or a metal oxide used as the antistatic agent is dry blended with the powder containing the base resin so as to be unevenly distributed on surfaces of respective powder particles, the effects, attained by the antistatic agent, of reducing the size of the agglomerated particle group by inhibiting the powder coating material from being charged, and of causing the powder coating material to be easily melted and flown by satisfactorily conducting the heat can be further satisfactorily attained.

The antistatic agent to be dry blended with the powder is preferably the carbon black, and the mixing ratio of the carbon black is preferably 0.01% by mass or more and 0.2% by mass or less based on an amount of the powder.

Since a carbon black is particularly excellent in the effect of reducing the size of the agglomerated particle group by inhibiting the powder coating material from being charged, and the effect of causing the powder coating material to be easily melted and flown by satisfactorily conducting the heat, the mixing ratio necessary, in the dry blending, for forming the continuous resin coating layer can be suppressed to the above-described range of 0.2% by mass or less, so that the mixing ratio of the base resin can be relatively increased to improve the strength and the like of the resin coating layer.

Incidentally, the mixing ratio of a carbon black is preferably 0.01% by mass or more because it is apprehended that the above-described effects attained by the dry blending of the carbon black cannot be sufficiently attained if the ratio is smaller than this range.

In consideration of providing the resin coating layer with a good sliding property and the like, the base resin is preferably polyamide.

In particular, in consideration of providing the resin coating layer with high heat resistance, good friction/wear property, sliding property and the like sufficient for use in an engine room, where the ambient temperature is, for example, continuously 120° C. and may instantaneously reach 150° C., the base resin is preferably polyamide 610.

The constitution of the present invention is applicable to a sliding shaft in which splines to be engaged with each other are respectively formed on the outer circumferential surface of the male shaft and the inner circumferential surface of the female shaft so that the male shaft and the female shaft can be connected to each other to be expandable/contractible along the axial direction through the engagement of the splines.

The present invention provides a steering device including the above-described sliding shaft of the present invention as an intermediate shaft transmitting steering force.

According to the present invention, the resin coating layer is formed on the outer circumferential surface of the male shaft or the inner circumferential surface of the female shaft included in the sliding shaft serving as the intermediate shaft to fill a clearance between these shafts, and therefore, rattling noise can be reduced and backlash occurring in a steering operation can be reduced.

Besides, particularly when polyamide 610 is used for forming the resin coating layer to improve the heat resistance, a steering device of a type in which the intermediate shaft is provided within an engine room can be also constituted.

MODE FOR CARRYING OUT THE INVENTION

Figure 1:
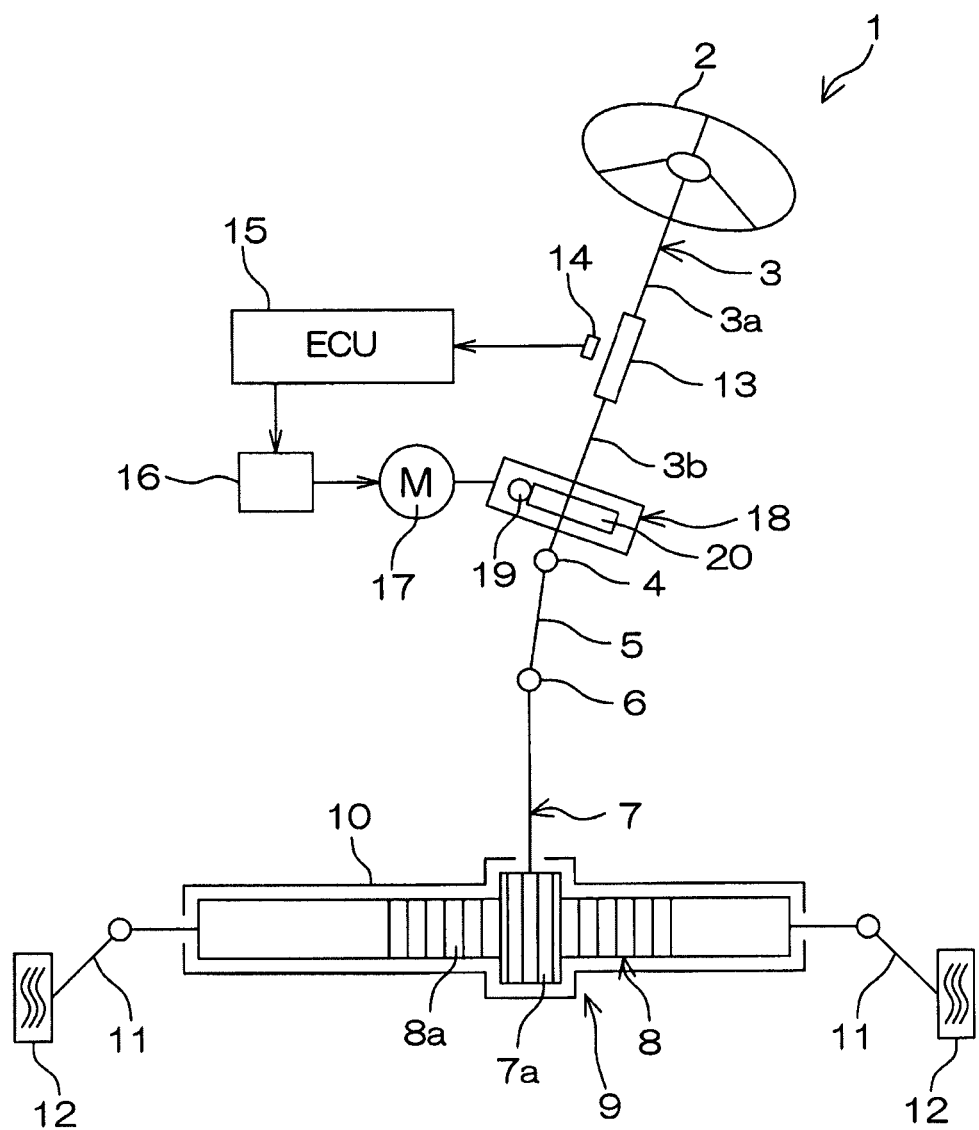
FIG. 1 is a schematic diagram of an electric power steering device according to one embodiment of the present invention.

FIG. 1 is a schematic diagram of an electric power steering device according to one embodiment of the present invention.

Referring to FIG. 1, the electric power steering device 1 includes a steering shaft 3 integrally rotatably connected to a steering wheel 2, an intermediate shaft 5 connected to the steering shaft 3 via a universal joint 4, a pinion shaft 7 connected to the intermediate shaft 5 via a universal joint 6, and a rack bar 8 extending along a lateral direction of a vehicle and having rack teeth 8*a* to be engaged with pinion teeth 7*a* provided on the pinion shaft 7.

The pinion shaft 7 and the rack bar 8 together constitute a steering mechanism 9 including a rack and pinion mechanism.

The rack bar 8 is linearly reciprocatably supported via a plurality of bearings not shown in a rack housing 10 fixed on a body of the vehicle. Both end portions of the rack bar 8 protrude on both sides of the rack housing 10, and are respectively connected to tie rods 11.

Each tie rod 11 is connected to a corresponding steered wheel 12 via a steering knuckle arm not shown.

When the steering wheel 2 is operated to rotate the steering shaft 3, the rotation is converted by the pinion teeth 7*a* and the rack teeth 8*a* into linear motion of the rack bar 8 along the lateral direction of the vehicle, so that the steered wheels 12 can be steered.

The steering shaft 3 is divided into an input shaft 3*a* continuous from the steering wheel 2 and an output shaft 3*b* continuous from the pinion shaft 7, and these shafts 3*a* and 3*b* are connected, via a torsion bar 13, to each other to be relatively rotatable on the same axis.

Besides, the torsion bar 13 is provided with a torque sensor 14 for detecting a steering torque based on an amount of relative rotational displacement between the shafts 3*a* and 3*b*, and a torque detection result obtained by the torque sensor 14 is given to an ECU (Electric Control Unit) 15.

The ECU 15 controls, via a drive circuit 16, drive of an electric motor 17 for steering assistance on the basis of the torque detection result, a vehicle speed detection result given from a speed sensor not shown, and the like. Then, the output rotation of the electric motor 17 is reduced in speed by a reduction gear 18, the resultant rotation is transmitted to the pinion shaft 7 and is converted into the linear motion of the rack bar 8, and thus, the steering is assisted.

The reduction gear 18 includes a pinion 19 serving as an input shaft rotationally driven by the electric motor 17, and a wheel 20 engaged with the pinion 19 and integrally rotatably connected to the output shaft 3*b* of the steering shaft 3.

Figure 2:
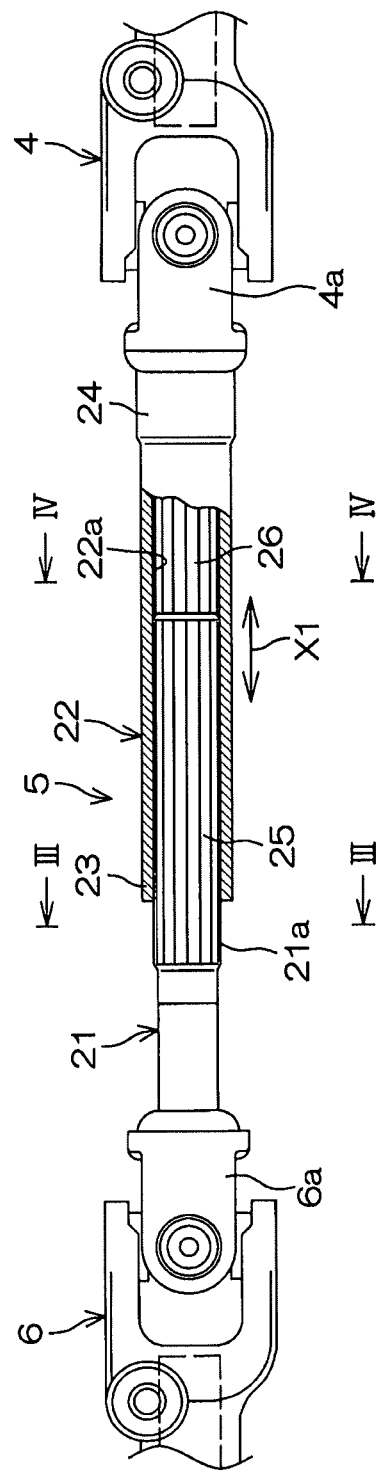
FIG. 2 is a cross-sectional view of a principal part of an intermediate shaft.

FIG. 2 is a cross-sectional view of a principal part of the intermediate shaft.

Referring to FIGS. 1 and 2, the intermediate shaft 5 includes a male shaft 21 corresponding to, for example, a lower shaft, and a cylindrical female shaft 22 corresponding to, for example, an upper shaft.

The upper end of the female shaft 22 is connected to a yoke 4*a* of the universal joint 4, and the lower end of the male shaft 21 is connected to a yoke 6*a* of the universal joint 6.

The female shaft 22 includes a first end portion 23 that is an open end, and a second end portion 24 that is a closed end. The second end portion 24 is connected to an end portion of the yoke 4*a* of the universal joint 4 to be closed.

The male shaft 21 is inserted into the female shaft 22 from the side of the first end portion 23 to be connected thereto slidably along an axial direction X1. Specifically, the male shaft 21 and the female shaft 22 are spline fit.

Figure 3:
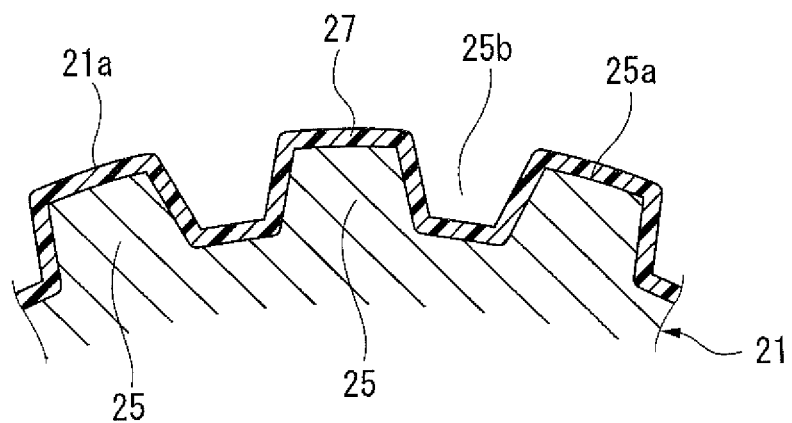
FIG. 3 is a cross-sectional view taken on line of FIG. 2.
Figure 4:
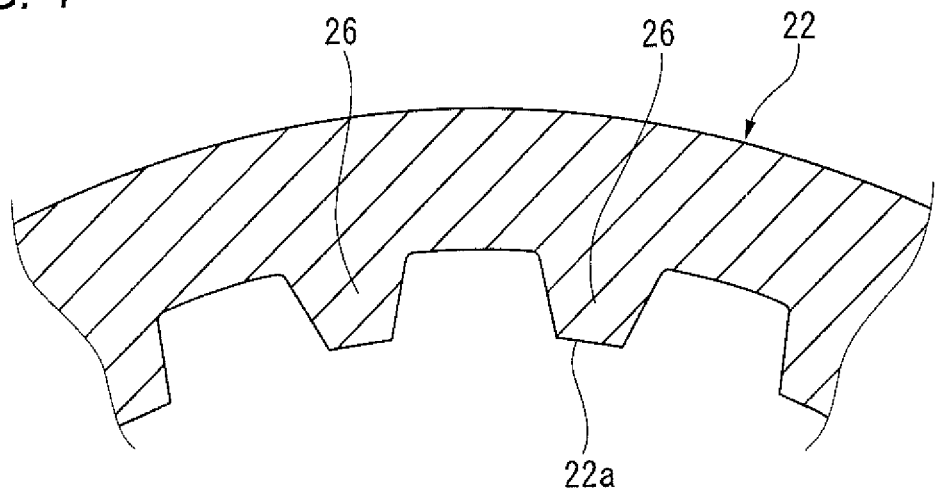
FIG. 4 is a cross-sectional view taken on line IV-IV of FIG. 2.

FIG. 3 is a cross-sectional view taken on line III-III of FIG. 2. Besides, FIG. 4 is a cross-sectional view taken on line IV-IV of FIG. 2.

Referring to FIGS. 2 and 3, an outer circumferential surface 21*a* of the male shaft 21 has a male spline 25 in parallel to the axial direction X1. Besides, referring to FIGS. 2 and 4, an inner circumferential surface 22*a* of the female shaft 22 has a female spline 26 in parallel to the axial direction X1 and to be engaged with the male spline 25.

Owing to the engagement between the male spline 25 and the female spline 26, namely, the spline fitting, the male shaft 21 and the female shaft 22 are relatively slidable along the axial direction X1 and capable of accompanying rotation.

Referring to FIG. 3, the outer circumferential surface 21*a* of the male shaft 21 including the male spline 25 is coated with a resin coating layer 27.

Since the resin coating layer 27 is thus provided, prescribed sliding resistance is given between the male shaft 21 and the female shaft 22, and in addition, a clearance between these shafts 21 and 22 is filled to reduce rattling noise and reduce backlash of the steering wheel 2 occurring in a steering operation.

The resin coating layer 27 is formed by a fluidized bed powder coating method.

Specifically, a powder coating material containing a base resin corresponding to a raw material of the resin coating layer 27 is first placed, in a fluidized bed, in a floating and fluidized state by blowing air or the like.

Subsequently, the male shaft 21 having been heated to a temperature equal to or higher than the melting point of the base resin is immersed in the floating and fluidized powder coating material, and thus, the powder coating material is deposited, and is allowed to melt and flow, on the outer circumferential surface 21*a* of the male shaft 21, so as to form the resin coating layer 27.

Figure 5A:
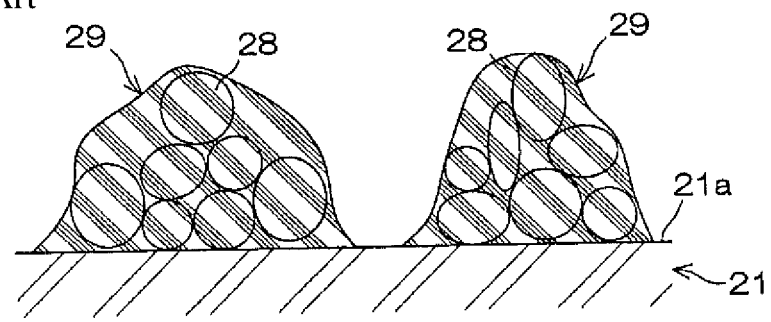
FIG. 5A is a cross-sectional view illustrating a state where a powder coating material according to a related-art technology is deposited on an outer circumferential surface of a male shaft.
Figure 5B:
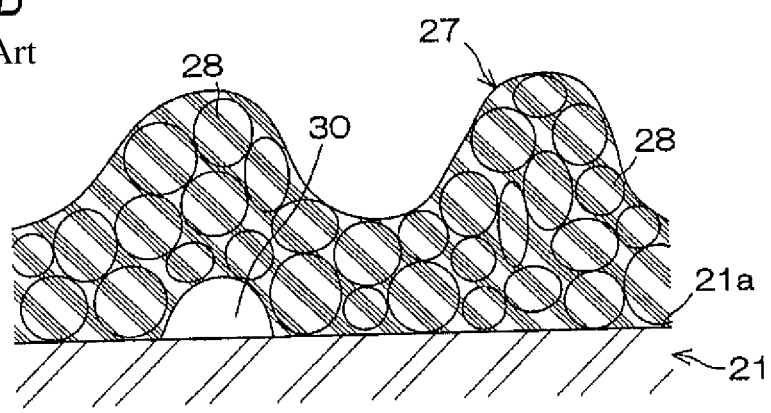
FIG. 5B is a cross-sectional view illustrating a state where the powder coating material is further deposited to form a continuous resin coating layer.
Figure 6:
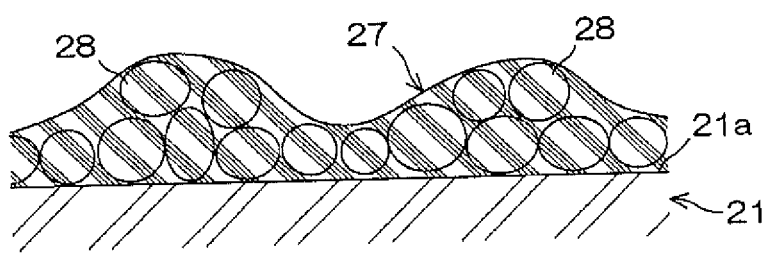
FIG. 6 is a cross-sectional view illustrating a state where a powder coating material is deposited, in the present invention, on an outer circumferential surface of a male shaft to form a continuous resin coating layer.

FIG. 5A is a cross-sectional view illustrating a state where a powder coating material of a related-art technology is deposited on the outer circumferential surface of the male shaft, and FIG. 5B is a cross-sectional view illustrating a state where the powder coating material is further deposited to form a continuous resin coating layer. Besides, FIG. 6 is a cross-sectional view illustrating a state where a powder coating material is deposited, in the present invention, on the outer circumferential surface of the male shaft to form the continuous resin coating layer.

Referring to FIG. 5A, if the powder coating material of the related-art technology containing neither a carbon black nor a metal oxide as an antistatic agent is used in the fluidized bed powder coating method, large agglomerated particle groups 29 each containing agglomeration of a large number of powder coating material particles 28 are formed on the outer circumferential surface 21*a* of the male shaft 21.

As the size of the agglomerated particle groups 29 is larger, the number thereof is smaller, and a distance between adjacent agglomerated particle groups is larger. Therefore, if the powder coating material 28 containing, as the base resin, polyamide 610, which cannot be smoothly melted and flown because it has a high viscosity when melted and has a low throwing power after deposition, is used, the respective agglomerated particle groups 29 are not mutually integrated while melting and flowing but retain an isolated state as illustrated in the drawing, and hence, a continuous resin coating layer cannot be formed.

Referring to FIG. 5B, when the powder coating material 28 is applied in a large thickness, recesses between the respective agglomerated particle groups 29 can be filled to form a continuous resin coating layer 27. However, a vacuum void 30 is easily formed through the aforementioned mechanism in a portion within such a resin coating layer 27, particularly in a thick portion (within a convex portion on a left hand side in the drawing).

On the contrary, referring to FIG. 6, if a powder coating material containing at least either a carbon black or a metal oxide as the antistatic agent is used in the fluidized bed powder coating method, the powder coating material is inhibited from being charged as described above so as to reduce the size of and increase the number of the agglomerated particle groups 29 formed on the outer circumferential surface 21a of the male shaft 21, and to reduce the distance between the adjacent agglomerated particle groups. Besides, heat from the outer circumferential surface 21a can be satisfactorily conducted so as to cause the powder coating material 28 to be easily melted and flown.

Accordingly, even if the powder coating material 28 containing polyamide 610 as the base resin is used, the continuous resin coating layer 27 can be formed without applying the powder coating material 28 in a large thickness, and the formation of a vacuum void otherwise caused by the thick application can be prevented.

The thus formed resin coating layer 27 is finished by polishing it in accordance with a clearance between the male shaft 21 and the female shaft 22. At this point, since no vacuum void is formed inside in the present invention, there is no fear of degradation of the strength and the like of the resin coating layer 27.

As the base resin used for forming the powder coating material 28, polyamide is suitably used in consideration of providing the resin coating layer 27 with a good sliding property and the like.

In particular, in consideration of providing the resin coating layer 27 with high heat resistance, and good friction/wear property, sliding property and the like sufficient for use in, for example, an engine room, polyamide 610 is particularly suitably used as the base resin.

The powder coating material 28 can be prepared by using the base resin in the same manner as in a related-art technology. Specifically, the powder coating material 28 can be prepared by mixing the base resin with various additives if necessary, and crushing and classifying the resultant mixture.

As a carbon black, any of various carbon blacks capable of functioning as an antistatic agent can be used. In particular, one, two or more of carbon blacks having volume resistivity of 0.01 Ω·cm or more and 0.4 Ω·cm or less, such as Ketjen black, furnace black and acetylene black, are preferred.

Besides, as a metal oxide, any of various metal oxides capable of functioning as an antistatic agent can be used. Examples of such a metal oxide include one, two or more metal oxides such as copper oxide, tin oxide, magnesium oxide and titanium oxide. In particular, from the viewpoint of the function as an antistatic agent, titanium dioxide is preferred.

Furthermore, as a metal oxide, one having volume resistivity of $10^3$ Ω·cm or more and $10^{10}$ Ω·cm or less is preferably used.

If at least either a carbon black or a metal oxide may be contained (internally added) in the powder coating material 28, the effects can be attained to some extent.

However, the powder coating material 28 is preferably constituted by dry blending (externally adding) at least either a carbon black or a metal oxide subsequently with a powder precedently formed by using the base resin (a main body of the powder coating material 28).

In this manner, at least either the carbon black or the metal oxide is unevenly distributed on the surfaces of respective powder particles containing the base resin, so as to more satisfactorily attain the effect of reducing the size of the agglomerated particle group by inhibiting the powder coating material 28 from being charged, and the effect of causing the powder coating material 28 to be easily melted and flown by satisfactorily conducting heat.

In particular, a carbon black is more effective in these effects than a metal oxide, and therefore, the continuous resin coating layer 27 can be formed by containing it in a smaller amount.

The mixing ratio of a carbon black employed in the dry blending is preferably 0.01% by mass or more and 0.2% by mass or less based on the amount of the powder.

If the mixing ratio is smaller than this range, it is apprehended that the effects attained by the dry blending of the carbon black cannot be sufficiently attained. On the other hand, if the ratio exceeds the range, not only an excessive effect cannot be attained, but also there is a fear of the degradation of the strength and the like of the resin coating layer 27 due to the excessive carbon black.

Incidentally, in consideration of further improving the effects attained by the dry blending of the carbon black, the mixing ratio of the carbon black is preferably 0.02% by mass or more, particularly 0.03% by mass or more in the above-described range.

Besides, in consideration of preventing the degradation of the strength and the like of the resin coating layer 27 due to the excessive carbon black, the mixing ratio of the carbon black is preferably 0.1% by mass or less, particularly 0.05% by mass or less in the above-described range.

Incidentally, in order to attain similar effects by the dry blending of a metal oxide, its mixing ratio may be set to be rather high. If the metal oxide is, for example, titanium dioxide, the mixing ratio of the titanium dioxide is preferably 0.5% by mass or more and 2% by mass or less based on the amount of the powder.

Furthermore, in order to attain the similar effects by containing a carbon black in the powder coating material 28, its mixing ratio may be also set to be rather high. Specifically, the mixing ratio of the carbon black is preferably 0.05% by mass or more and 2% by mass or less on the basis of the amount of the base resin constituting the powder coating material 28 together with the carbon black.

Conditions to be employed for forming the resin coating layer 27 by the fluidized bed powder coating method can be set in the same manner as in a related-art technology.

A base layer may be precedently formed on the outer circumferential surface 21a of the male shaft 21 before forming the resin coating layer 27. An example of such a base layer includes a layer formed by applying a varnish of a curable resin such as an epoxy resin or a polyamide imide resin and curing the resultant.

In particular, if a base layer is combined with the resin coating layer 27 containing polyamide 610 to constitute an intermediate shaft to be used in an engine room required of high heat resistance, the base layer is preferably formed by applying a varnish of a curable resin containing a polyamide imide resin as a base agent and curing the resultant.

The thickness of the resin coating layer 27 may be substantially the same as the clearance between the male shaft 21 and the female shaft 22. Besides, if the base layer is formed, the total thickness of the base layer and the resin coating layer 27 may be substantially the same as the clearance.

For adjusting the thickness, the resin coating layer 27 formed by the fluidized bed powder coating method may be polished as described above.

The resin coating layer may be formed on the inner circumferential surface 22a of the female shaft 22 instead of the outer circumferential surface 21a of the male shaft 21. However, there is no need to form the coating layer on both the surfaces.

The steering device including the sliding shaft as the intermediate shaft 5 is not limited to the column-type electric power steering device illustrated in FIG. 1, but may be another type power steering device or a steering device not having a steering assist function.

The sliding shaft may be applied to, for example, an expandable/contractible shaft or the like used for providing an impact absorbing stroke in a steering device.

In addition, various changes and modifications can be made in design without departing from the scope of the present invention.

EXAMPLES

Preparation of Powder Coating Material

A powder coating material of Example 1 was obtained by dry blending furnace black, one of carbon blacks, with a powder formed by using polyamide 610 as the base resin to attain a content of 0.05% based on the amount of the powder.

Besides, a powder in which no furnace black was dry blended was used as a powder coating material of Comparative Example 1.

<Formation of Resin Coating Layer>

The thus prepared powder coating material of Example 1 or Comparative Example 1 was used for forming, by the fluidized bed powder coating method, a resin coating layer on an outer circumferential surface including a spline of a male shaft of a sliding shaft.

Specifically, the powder coating material was placed, in a fluidized bed, in a floating and fluidized state by blowing air or the like, the male shaft heated to 250° C., that is, a temperature equal to or higher than the melting point of polyamide 610, was immersed therein, and was drawn up for cooling after a prescribed period of time.

In using the powder coating material of Comparative Example 1, however, a continuous resin coating layer could not be formed, by immersing the shaft once, particularly on a tooth tip 25a (see FIG. 3) of the male spline 25.

Figure 7:
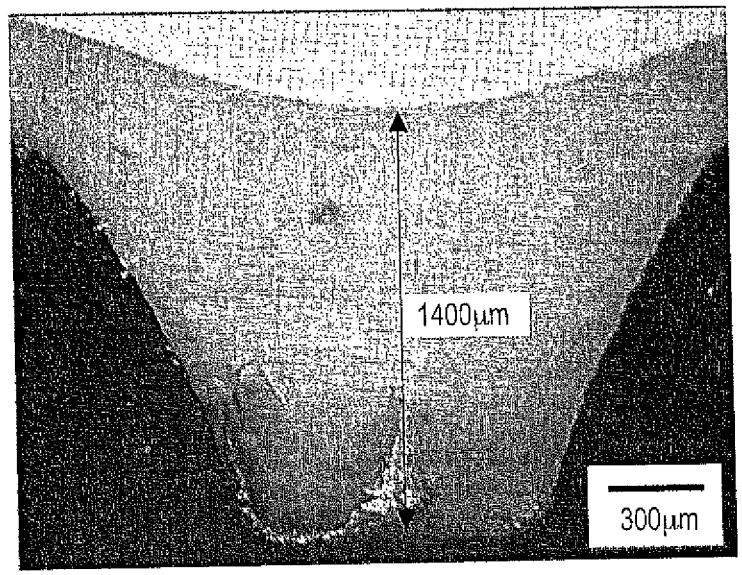
FIG. 7 is a microphotograph of a cross-section of a resin coating layer formed in a comparative example.

Therefore, the number of times of immersion was increased to two, and thus, the continuous resin coating layer was formed up to the tooth tip 25a. However, when the male shaft including the resin coating layer was cut to observe the cross-section with a microscope, it was found, as illustrated in FIG. 7, that the resin coating layer was formed in a large thickness of 1400 μm within a tooth space 25b of the male spline 25 (see FIG. 3), and that a large number of vacuum voids were formed inside the resin coating layer. In particular, at the base of the male spline 25 on the left hand side in FIG. 7, a large vacuum void having a diameter of about 560 μm was observed.

On the other hand, in using the powder coating material of Example 1, the continuous resin coating layer was formed up to the tooth tip 25a of the male spline 25 by immersing the shaft once.

Figure 8:
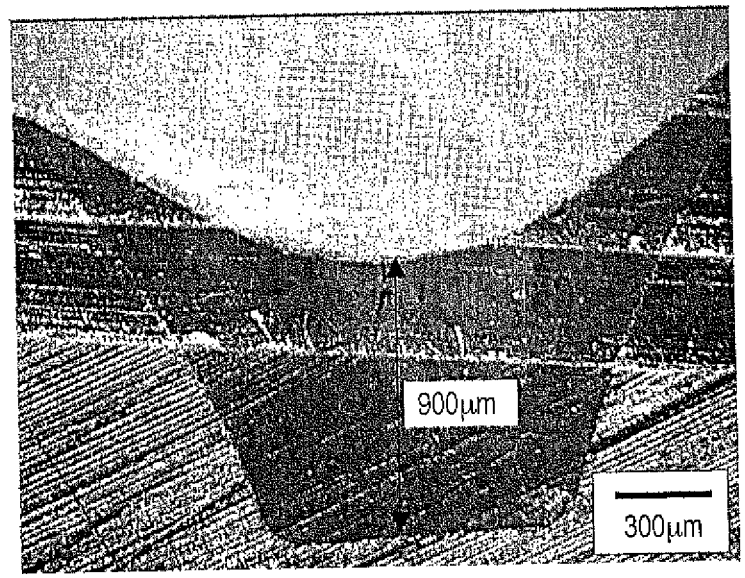
FIG. 8 is a microphotograph of a cross-section of a resin coating layer formed in an example.

When the male shaft including the resin coating layer was cut to observe a cross-section with a microscope, as illustrated in FIG. 8, the resin coating layer had a small thickness of 900 μm in the tooth space 25b of the male spline 25, and no vacuum void was observed inside.

On the basis of these results, it was confirmed that a continuous resin coating layer free from a vacuum void can be formed on an outer circumferential surface of a male shaft by the fluidized bed powder coating method with an antistatic agent such as a carbon black contained in a powder coating material.

This application is based upon the prior Japanese patent application (Japanese Patent Application No. 2013-149609), filed on Jul. 18, 2013, the entire contents of which are incorporated herein by reference.

INDUSTRIAL APPLICABILITY

According to the present invention, a sliding shaft in which a continuous resin coating layer free from a vacuum void is formed on an outer circumferential surface of a male shaft or an inner circumferential surface of a female shaft by a fluidized bed powder coating method using a powder coating material can be realized.

DESCRIPTION OF THE REFERENCE NUMERALS AND SIGNS

1: electric power steering device, 2: steering wheel, 3: steering shaft, 3a: input shaft, 3b: output shaft, 4: universal joint, 4a: yoke, 5: intermediate shaft, 6: universal joint, 6a: yoke, 7: pinion shaft, 7a: pinion tooth, 8: rack bar, 8a: rack tooth, 9: steering mechanism, 10: rack housing, 11: tie rod, 12: steered wheel, 13: torsion bar, 14: torque sensor, 15: ECU, 16: drive circuit, 17: electric motor, 18: reduction gear, 19: pinion, 20: wheel, 21: male shaft, 21a: outer circumferential surface, 22: female shaft, 22a: inner circumferential surface, 23: first end portion, 24: second end portion, 25: male spline, 25a: tooth tip, 25b: tooth space, 26: female spline, 27: resin coating layer, 28: powder coating material, 29: agglomerated particle group, 30: vacuum void, X1: axial direction

The invention claimed is:

1. A sliding shaft comprising a male shaft and a cylindrical female shaft connected to each other slidably along an axial direction, an outer circumferential surface of the male shaft or an inner circumferential surface of the female shaft being coated with a resin coating layer, wherein
the resin coating layer is formed, by a fluidized bed powder coating method, by using a powder coating material, the powder coating material containing:
a base resin; and
at least one antistatic agent including a carbon black, a mixing ratio of the carbon black in the resin coating layer being 0.01% by mass or more and 0.05% by mass or less, and wherein splines to be engaged with each other are respectively formed on the outer circumferential surface of the male shaft and the inner circumferential surface of the female shaft, and the male shaft and the female shaft are connected to each other to be expandable/contractible along the axial direction through engagement of the splines.

2. The sliding shaft according to claim 1, wherein the powder coating material is obtained by dry blending the antistatic agent with a powder containing the base resin.

3. The sliding shaft according to claim 1, wherein the base resin is polyamide.

4. The sliding shaft according to claim 3, wherein the base resin is polyamide 610.

5. A steering device comprising the sliding shaft according to claim 1 as an intermediate shaft transmitting steering force.

6. A sliding shaft comprising a male shaft and a cylindrical female shaft connected to each other slidably along an axial direction, an outer circumferential surface of the male shaft or an inner circumferential surface of the female shaft being coated with a resin coating layer, wherein
   the resin coating layer is formed, by a fluidized bed powder coating method, by using a powder coating material, the powder coating material containing:
   a base resin; and
   at least one antistatic agent including a carbon black having volume resistivity of 0.01 Ω·cm or more and 0.4 Ω·cm or less, and wherein splines to be engaged with each other are respectively formed on the outer circumferential surface of the male shaft and the inner circumferential surface of the female shaft, and the male shaft and the female shaft are connected to each other to be expandable/contractible along the axial direction through engagement of the splines.

* * * * *